United States Patent [19]

Mueller

[11] Patent Number: 5,695,840
[45] Date of Patent: Dec. 9, 1997

[54] FILMS FOR MEDICAL SOLUTION POUCHES

[75] Inventor: Walter B. Mueller, Inman, S.C.

[73] Assignee: W. R. Grace & Co.-Conn., Duncan, S.C.

[21] Appl. No.: 408,667

[22] Filed: Mar. 22, 1995

[51] Int. Cl.$^6$ .................... B32B 27/08; B32B 27/32
[52] U.S. Cl. .................... 428/35.7; 428/35.9; 428/515; 428/516
[58] Field of Search .................... 428/34.3, 34.7, 428/35.2, 35.7, 35.9, 36.9, 480, 483, 474.4, 515, 516, 523

[56] References Cited

U.S. PATENT DOCUMENTS

| | | | |
|---|---|---|---|
| 4,188,443 | 2/1980 | Mueller et al. | 428/216 |
| 4,274,900 | 6/1981 | Muellet et al. | 156/229 |
| 4,352,849 | 10/1982 | Mueller | 428/213 |
| 4,359,495 | 11/1982 | Schroeder et al. | 428/35 |
| 4,391,862 | 7/1983 | Bornstein et al. | 428/35 |
| 4,407,874 | 10/1983 | Gehrke | 428/35 |
| 4,528,220 | 7/1985 | Hwo | 428/35 |
| 4,643,926 | 2/1987 | Mueller | 428/35 |
| 4,726,997 | 2/1988 | Mueller et al. | 428/480 |
| 4,803,102 | 2/1989 | Raniere et al. | 428/35 |
| 4,816,343 | 3/1989 | Mueller et al. | 428/480 |
| 4,885,119 | 12/1989 | Mueller et al. | 264/22 |
| 4,891,253 | 1/1990 | Mueller | 428/35.2 |
| 4,966,795 | 10/1990 | Genske et al. | 428/34 |
| 5,139,831 | 8/1992 | Mueller | 428/34.3 |
| 5,206,075 | 4/1993 | Hodgson, Jr. | 428/216 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |
| 5,491,019 | 2/1996 | Kuo | 428/213 |

FOREIGN PATENT DOCUMENTS

WO 90/03414  4/1990  WIPO.
WO 93/03093  2/1993  WIPO.

OTHER PUBLICATIONS

Polyolefin Elastomer, Dow Plastics, Jan. 1994.
Medical Grade Polyolefin, Horizon Polymer, no date.
Fina Polypropylene(Z9450), Fina Oil & Chemical, Jun. 1989.

*Primary Examiner*—John J. Zimmerman
*Attorney, Agent, or Firm*—Thomas C. Lagaly

[57] ABSTRACT

A multilayer film generally includes:

a) a first layer of a blend of homopolymer or copolymer of polypropylene and elastomer; and b) a second layer in adherence with the first layer and including an ethylene/alpha-olefin copolymer having a density of less than or equal to 0.89 grams per cubic centimeter.

Such multilayer film is advantageously used to produce flexible pouches for the packaging and administration of medical solutions.

34 Claims, 1 Drawing Sheet

FILMS FOR MEDICAL SOLUTION POUCHES

BACKGROUND OF THE INVENTION

This invention relates to multilayer films and, more particularly, to multilayer films which are suitable for the packaging and administration of medical solutions in the form of flexible pouches.

Currently, it is common medical practice to supply medical solutions for parenteral (e.g., intravenous) administration in the form of disposible, flexible pouches. One class of such pouches is commonly referred to as an "I.V. bag." These pouches must meet a number of performance criteria, including collapsibility, optical clarity and transparency, high-temperature heat-resistance, and sufficient mechanical strength to withstand the rigors of the use environment. Medical solution pouches must also provide a sufficient barrier to the passage of moisture vapor and other gasses to prevent contamination of the solution contained therein.

Collapsibility is necessary in order to ensure proper and complete drainage of the pouch. Unlike rigid liquid containers which rely on air displacement for drainage, medical solution pouches rely on collapsibility for drainage. As the pouch drains, atmospheric pressure collapses the pouch at a rate which is proportional to the rate of drainage. In this manner, the pouch can be fully drained and at a substantially constant rate. In order for the pouch to be collapsible, the film from which the pouch is made must be flexible. If the film is too stiff, the pouch cannot drain fully and, as a result, the patient may not receive the intended quantity of medical solution. Thus, a key consideration in the design of films used to produce medical solution pouches is that the film must have sufficient flexibility that the resultant medical pouch is collapsible enough to be fully drainable.

Prior to administering a medical solution from a pouch and into a patient, a visual inspection of the solution contained within the pouch is performed by the medical professional who is performing the administration procedure. Such an inspection provides a cursory determination that the medical solution to be administered is of the proper type and has not deteriorated or become contaminated. In this regard, it is essential that the pouch have excellent optical properties, i.e., a high degree of clarity and transmission and a low degree of haze. A medical solution pouch having poor optical properties can easily render a visual inspection of the packaged solution ineffective, thereby causing the medical professional to needlessly discard the pouch. Worse, the medical professional could fail to notice a solution which is of the wrong type, or which had deteriorated or become contaminated.

Heat-sterilization of solution-containing medical pouches typically occurs in an autoclave at about 250° F. for periods of 15 to 30 minutes. Steam is generally used as the heat-transfer medium. Heat-sterilization is normally performed by the manufacturer and/or packager of the medical solution prior to sending the packaged medical solution to the end user, e.g., a hospital. This helps to ensure that the medical solution, as packaged in the medical solution pouch, will be substantially free from contamination. Thus, another requirement of medical solution pouches is that they must be able to endure the high temperatures which are encountered during heat-sterilization without deterioration by, e.g., developing a heat-seal leak or other type of containment failure.

Medical solution pouches must also have sufficient mechanical strength to withstand the abuse which is typically encountered in the use environment. For example, in some circumstances, a plastic or rubber bladder is placed around a medical solution-containing pouch and pressurized to, e.g., 300–400 mm/Hg, in order to force the solution out of the pouch an into a patient. Such a bladder is commonly referred to as a "pressure-cuff" and is used, e.g., when a patient is bleeding profusely in order to quickly replace lost fluids or, e.g., when a patient has high blood pressure such that a greater opposing pressure must be generated in the pouch in order to introduce medical solution into the patient's veins. Medical solution pouches should have sufficient durability to remain leak-free during such procedures.

At present, flexible pouches for medical solution packaging are typically made from a highly plasticized polyvinyl chloride (PVC). While generally meeting the requirements mentioned above, PVC may have some undesirable properties for use as a medical solution pouch. For example, plasticizer can migrate from the PVC pouch and into the solution contained within the pouch so that the solution may become contaminated by potentially toxic material. A question has also arisen concerning whether PVC is adequately chemically neutral to medical solutions. It also been found that PVC becomes brittle at relatively low temperatures.

For these reasons, alternatives to PVC pouches have been sought. Such alternative pouches are typically formed from polyolefin-containing, multilayer films wherein one outer layer of the film is an abuse-resistant layer and forms the outside of the pouch, while the other outer layer of the film is a heat-seal layer, i.e., a layer able to seal to itself upon the application of sufficient heat, and forms the inside of the pouch. An adhesive layer is normally required to bond the heat-seal layer to the rest of the film.

A shortcoming of the foregoing multilayer, polyolefin-containing pouches is their inability to consistently withstand the application of a pressure-cuff for an extended period of time. Currently-available pouches often fail prematurely under such circumstances. The inventor has determined that the cause of this problem is poor adhesion between the heat-seal layer and the adhesive layer in the film used to form the pouches. Because of the poor adhesion, the heat-seal layer is not properly supported and strengthened by the rest of the film. As a result, the heat-seal layer is highly susceptible to being ruptured during the application of a pressure-cuff due to the increased fluid pressure within the pouch. Another consequence of the poor adhesion is that, once the heat-seal layer has been ruptured, the medical solution can easily flow out of the pouch between the heat seal layer and the adhesive layer.

Accordingly, a need exists in the art for a multilayer, polyolefin-based film which is a suitable replacement for PVC as a material for the manufacture of medical solution pouches, and which has improved resistance to leakage when a pressure-cuff is applied to a pouch made from such multilayer film.

SUMMARY OF THE INVENTION

That need is met by the present invention which provides a multilayer film, comprising:

a) a first layer comprising a blend of homopolymer or copolymer of polypropylene and elastomer; and b) a second layer in adherence with the first layer, the second layer comprising an ethylene/alpha-olefin copolymer having a density of less than or equal about 0.89 grams per cubic centimeter.

The first layer preferably comprises a propylene/ethylene copolymer having from about 2 to about 10 percent by weight ethylene and, more preferably, from about 4 to about 6 percent ethylene.

The elastomer may be selected from the group consisting of styrene-ethylene-butylene-styrene block copolymer, styrene-butadiene-styrene block copolymer, styrene-isoprene-styrene block copolymer, ethylene-propylene rubber, and ethylene-propylene-diene terpolymer. Preferably, the elastomer is present in the first layer at a weight percentage ranging from about 5 to about 50 and, more preferably, from about 10 to about 40.

The foregoing multilayer film of the present invention is particularly useful as a material from which flexible pouches for the packaging and administration of medical solutions can be formed. As such, the first layer preferably functions as a heat-seal layer and forms the inside surface of the pouch. The second layer preferably serves to bond the first, heat-seal layer to additional layers which provide properties which are desirable when the multilayer film of the present invention is to be used to form a medical solution pouch.

Such additional layers preferably include: a third, core layer in adherence with the second, adhesive layer; a fourth, adhesive layer in adherence with the third, core layer; and a fifth, heat/abuse-resistant layer in adherence with fourth, adhesive layer.

The third, core layer may comprise a material selected from the group consisting of very low density polyethylene, linear low density polyethylene, ethylene/vinyl acetate copolymer, ethylene/methyl acrylate copolymer, high density polyethylene, homogeneous ethylene/alpha-olefin copolymer, and blends of the foregoing materials.

The fourth, adhesive layer may comprise a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, and anhydride-modified very low density polyethylene.

The fifth, heat/abuse-resistant layer may comprise a material selected from the group consisting of polyamide, copolyamide, and copolyester.

Another aspect of the present invention pertains to a pouch for the packaging and administration of medical solutions, the pouch comprising any of the multilayer films described above.

When used to form medical solution pouches, the multilayer films of the present invention have been found to provide much better resistance to leakage upon the application of a pressure-cuff than previous multilayer, polyolefin-based films. Such improved resistance to leakage is believed to result from the excellent adhesion between the first, heat-seal layer and the second, adhesive layer. Conventionally, an adhesive or "tie" layer which bonds one layer to another contains a component or components which are similar in composition to both of the bonded layers. Often, this is accomplished by blending portions of both of the bonded layers in the adhesive layer. The inventor has surprisingly found that an adhesive layer comprising an ethylene/alpha-olefin copolymer having a density of 0.89 g/cc or less adheres very well to a heat seal layer comprising a blend of a homopolymer or copolymer of prolypropylene and an elastomer. Good adhesion between such layers was unexpected because of their dissimilarities, the adhesive layer being primarily polyethylene and the heat-seal layer being primarily polypropylene. Such unexpectedly good adhesion is believed to be the reason for the dramatically improved pressure-cuff performance of medical solution pouches of the present invention verses conventional medical solution pouches wherein the adhesive layer joining the heat-seal and core layers comprises a blend of the components from which the heat-seal and core layers are formed. The second, adhesive layer also adheres well to the third, core layer.

In addition to providing excellent pressure-cuff performance, the multilayer films of the present invention are optically clear, have good flexibility and mechanical strength, and are able to withstand high-temperature sterilization. Moreover, the films provide a good barrier to the passage of moisture vapor and other gasses. For these reasons, the inventive multilayer films are ideally suited for the packaging of medical solutions. However, the films could also be used in any other application wherein a polypropylene heat-seal layer is employed.

Definitions

As used herein, the terms "film" and the like refer to a thermoplastic material, generally in sheet or web form, having one or more layers of polymeric materials which may be bonded together by any suitable means well known in the art.

As used herein, the terms "polymer," "polymeric," and the like, unless specifically defined, generally include homopolymers, copolymers, terpolymers, and blends and modifications thereof.

As used herein, the terms "elastomer" and the like refer to a material that, at room temperature, can be stretched repeatedly to at least twice its original length. This characteristic distinguishes plastics from elastomers and rubbers, as well as the fact that elastomers are given their final properties by mastication with fillers, processing aids, antioxidants, curing agents, etc., followed by vulcanization (curing) at elevated temperatures. However, a few elastomers are thermoplastic. Such thermoplastic elastomers include the following preferred materials: styrene-ethylene-butylene-styrene copolymer (SEBS), styrene-butadiene-styrene copolymer (SBS), styrene-isoprene-styrene copolymer (SIS), ethylene-propylene rubber (EPM), and ethylene-propylene-diene-terpolymer (EPDM).

As used herein, the term "ethylene/alpha-olefin copolymer" generally designates copolymers of ethylene with one or more comonomers selected from $C_3$ to $C_{20}$ alpha-olefins, such as 1-butene, 1-pentene, 1-hexene, 1-octene, methyl pentene and the like, in which the polymer molecules comprise long chains with relatively few side chain branches. These polymers are obtained by low pressure polymerization processes and the side branching which is present will be short compared to non-linear polyethylenes (e.g., LDPE, a low density polyethylene homopolymer). Ethylene/alpha-olefin copolymers generally have a density in the rage of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc. Sometimes linear polyethylene in the density range from about 0.926 to about 0.94 is referred to as linear medium density polyethylene (LMDPE). Lower density ethylene/alpha-olefin copolymers may be referred to as very low density polyethylene (VLDPE, typically used to refer to the ethylene/butene copolymers available from Union Carbide with a density ranging from about 0.88 to about 0.91 g/cc) and ultra-low density polyethylene (ULDPE, typically used to refer to the ethylene/octene copolymers supplied by Dow).

The phrase "ethylene/alpha-olefin copolymers" also includes homogeneous polymers such as metallocene-catalyzed EXACT™ linear homogeneous ethylene/alpha-olefin copolymer resins obtainable from the Exxon Chemical Company, of Baytown, Tex.; TAFMER™ linear homogeneous ethylene/alpha-olefin copolymer resins obtainable from the Mitsui Petrochemical Corporation; and long-chain branched, metallocene-catalyzed homogeneous ethylene/alpha-olefin copolymers available from The Dow Chemical Company, known as AFFINITY™ resins. The phrase "homogeneous polymer" refers to polymerization reaction products of relatively narrow molecular weight distribution and relatively narrow composition distribution. Homogeneous polymers are structurally different from heterogeneous polymers (e.g., ULDPE, VLDPE, LLDPE, and LMDPE) in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysts, rather than using Ziegler-Natta catalysts. Such single-site catalysts typically have only one type of catalytic site, which is believed to be the basis for the homgeniety of the polymers resulting from the polymerization.

A homogeneous ethylene/alpha-olefin copolymer can, in general, be prepared by the copolymerization of ethylene and any one or more alpha-olefin. Preferably, the alpha-olefin is a $C_3$–$C_{20}$ alpha-monoolefin, more preferably, a $C_4$–$C_{12}$ alpha-monoolefin, still more preferably, a $C_4$–$C_8$ alpha-monoolefin. Still more preferably, the alpha-olefin comprises at least one member selected from the group consisting of 1-butene, 1-pentene, 1-hexene, and 1-octene. Processes for preparing and using homogeneous polymers are disclosed in U.S. Pat. Nos. 5,206,075, 5,241,031, 5,272, 236, and 5,278,272; and in PCT International Publication Nos. WO 90/03414 and 93/03093, all of which are hereby incorporated by reference herein in their respective entireties.

As used herein, the term "olefin" generally refers to any one of a class of monounsaturated, aliphatic hydrocarbons of the general formula $C_nH_{2n}$, such as ethylene, propylene, and butene. The term may also include aliphatics containing more than one double bond in the molecule such as a diolefin or diene, e.g., butadiene.

As used herein, the term "polyolefin" refers to olefin polymers and copolymers, especially ethylene and propylene polymers and copolymers, and to polymeric materials having at least one olefinic comonomer, such as ethylene vinyl acetate copolymer and ionomer. Polyolefins can be linear, branched, cyclic, aliphatic, aromatic, substituted, or unsubstituted. Included in the term polyolefin are homopolymers of olefin, copolymers of olefin, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, e.g., maleic acid, fumaric acid or the like, or a derivative thereof such as the anhydride, ester metal salt or the like. It could also be obtained by incorporating into the olefin homopolymer or copolymer, an unsaturated carboxylic acid, e.g., maleic acid, fumaric acid or the like, or a derivative thereof such as the anhydride, ester metal salt or the like.

DETAILED DESCRIPTION OF THE PREFERRED EMBODIMENTS

Figure 1:
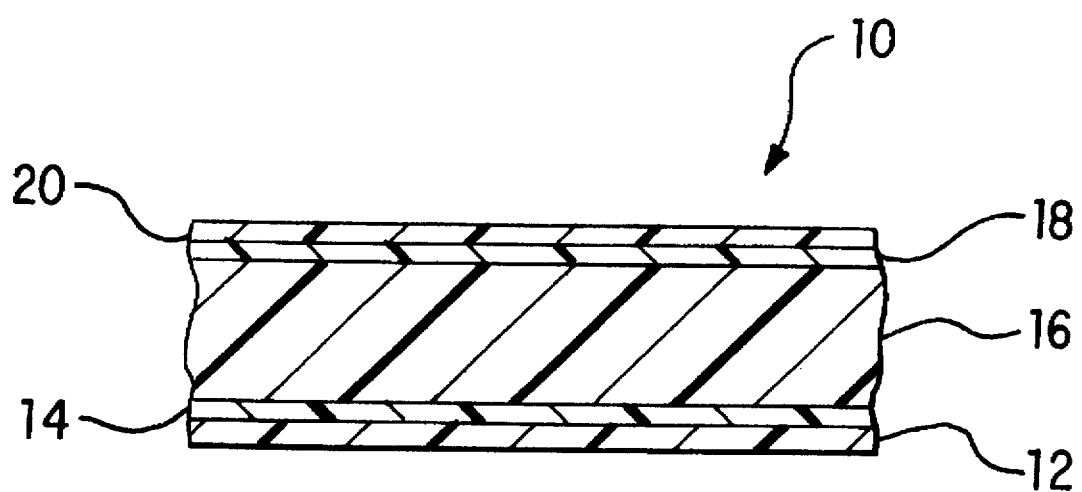
FIG. 1 is a schematic cross-section of a five-layer film in accordance with the present invention.

FIG. 1 shows a five-layer film 10 in accordance with the present invention which is suitable for forming a flexible pouch to package and administer medical solutions. Examples of medical solutions which are packaged and administered in this manner include saline solutions, dextrose solutions, and solutions for dialysis applications.

When film 10 is formed into a medical solution pouch, first, heat-seal layer 12 will form the inside surface of the pouch, i.e., the surface which is in contact with the packaged medical solution. The primary function of layer 12 is to form a heat-seal when the film 10 is folded upon itself or mated with another film such that two regions of layer 12 are brought into contact with one another and sufficient heat is applied to predetermined segments of the contacting regions of layer 12 that the heated segments become molten and intermix with one another. Upon cooling, the heated segments of layer 12 become a single, essentially inseparable layer. In this manner, the heated segments of layer 12 produce a liquid-tight closure which is commonly referred to as a heat-seal. The heat-seals thus formed are generally fin-shaped and are linked together to define the peripheral boundaries of the pouch so that a medical solution can be fully enclosed therein.

The material from which the heat-seal layer is formed must be able to maintain a liquid-tight heat-seal in a wide variety of severe conditions which are typically encountered by a medical solution pouch. During heat-sterilization, for example, medical solution pouches are exposed to high temperatures (e.g., 250° F.) for periods of 15 to 30 minutes. Thus, the heat-seal material must have sufficient heat-resistance to maintain a seal under such conditions. In addition, the heat-seal material must have sufficient creep-resistance to maintain a heat-seal when the pouch is placed in a pressure-cuff. Without sufficient creep-resistance, the relatively high fluid pressure of the medical solution inside the pouch would force the heat-seal apart. Additionally, the heat-seal material must have sufficient impact-resistance to maintain a seal when the solution-containing pouch is dropped or otherwise handled roughly.

The foregoing criteria are satisified by the first, heat-seal layer 12 of the present invention which comprises a blend of homopolymer or copolymer of polypropylene and elastomer. The polyproplylene has been found to impart good heat-resistance to layer 12 while the elastomer provides creep- and impact-resistance thereto. When the elastomer is blended with polypropylene such that the weight percentage of elastomer ranges from about 5 to about 50 (based on the total weight of layer 12), excellent heat-seals can be produced. The best heat-seals are obtained when the elastomer is present at a weight percentage ranging from about 10 to 40 and, most preferably, from about 10 to 30. Such heat-seals are consistently able to withstand all of the aforementioned severe conditions typically encountered by medical solution pouches, i.e., heat-sterilization, pressure-cuff application, and general rough handling.

The homopolymer or copolymer of polypropylene is preferably a propylene/ethylene copolymer having from about 2 to about 10 percent by weight ethylene and, more preferably, from about 4 to about 6 percent ethylene. A suitable propylene/ethylene copolymer is commercially available from the Fina Oil & Chemical Company under the tradename Z9450, and has an ethylene content of about 6 weight percent. Other commercially available propylene/ethylene copolymers include, e.g., PLTD 665 from Exxon.

The polypropylene used in layer 12 may be of any of the available types, i.e., isotactic, syndiotactic, and, less preferably, atactic.

The elastomer may be selected from the group consisting of styrene-ethylene-butylene-styrene block copolymer (SEBS), styrene-butadiene-styrene block copolymer (SBS), styrene-isoprene-styrene block copolymer (SIS), ethylene-propylene rubber (EPM), and ethylene-propylene-diene terpolymer (EPDM). SEBS is commercially available, e.g., from the Shell Chemical Co. as Kraton G-1650, G-1652, and G-1657X. SBS is commercially available, e.g., from Shell as Kraton D-1101, D-1102, D-1300C, D-4122, D-4141, D-4455X, and D-4460X. SIS is commercially available, e.g., from Shell as Kraton D-1107, D-1111, D-1112, and D-1117. EPM is commercially available, e.g., from Exxon as Vistalon 719 or 503. EPDM is commercially available, e.g., from Exxon as Vistalon 3708.

Suitable, pre-prepared blends of polypropylene and elastomer are also commercially available. For example, Z-4650 from Horizon Polymers is a blend of 80 percent by weight Z9450 (propylene/ethylene copolymer as described above) and 20 percent by weight Kraton G-1652 (SEBS as described above).

Second, adhesive layer 14 is in adherence with first, heat-seal layer 12. As discussed above, this layer has been found to play a critical role in the performance of a medical solution pouch when a pressure-cuff is applied thereto. That is, insufficient adherence between this layer and heat-seal layer 12 has been found to be a key reason for the failure (i.e., leakage) of medical solution pouches during the application of a pressure-cuff. The inventor has discovered that when layer 14 comprises an ethylene/alpha-olefin copolymer having a density of less than or equal to about 0.89 grams per cubic centimeter, excellent adhesion is attained between this layer and heat-seal layer 12. As a result (and as demonstrated in the Examples below), the pressure-cuff performance of medical solution pouches made from the multilayer films of the present invention is markedly superior to that of pouches made from conventional multilayer films. That is, the time period during which a medical solution pouch can be maintained in a pressure-cuff without failing has been dramatically increased by the multilayer films of the present invention.

Although not wishing to be bound by theory, it is believed that the excellent adhesion between layers 12 and 14 results from the entanglement of pendent alpha-olefin groups in the ethylene/alpha-olefin copolymer of layer 14 with pendent methyl groups in the polypropylene of layer 12 at the interface of the two layers. The alpha-olefin groups are also believed to increase the occurence of adhesion-enhancing amorphous regions (as opposed to, e.g., adhesion-defeating crystalline regions) at the interface of the two layers. The adhesive effect of these phenomena increases with an increasing content of alpha-olefin comonomer in the ethylene/alpha-olefin copolymer. In order to have a beneficial effect on the adhesion of layers 12 and 14, however, a minimum amount of alpha-olefin must be present in the ethylene/alpha-olefin copolymer. This minimum amount of alpha-olefin comonomer has been determined to be at least about 20% by weight of the copolymer. This corresponds to an ethylene/alpha-olefin density of approximately 0.89 grams per cubic centimeter. These figures may vary somewhat depending on the comonomer type and the polymerization process used to produce the comonomer. Nevertheless, as the content of alpha-olefin comonomer in the ethylene/alpha-olefin copolymer increases, the density of the copolymer decreases. Thus, ethylene/alpha-olefins having a density of about 0.89 g/cc or less are preferred. More preferably, the density is less than about 0.88 g/cc. Currently, the lowest densities available for ethylene/alpha-olefins are around 0.86 g/cc. If lower-density ethylene/alpha-olefins become available in the future, these would be included within the scope of the present invention. Preferred alpha-olefin comonomers include 1-butene, 1-pentene, 1-hexene, and 1-octene.

The most widely available ethylene/alpha-olefin copolymers with densities of 0.89 g/cc or less are those which are homogeneous, e.g., metallocene-catalyzed. Such copolymers are commercially available from resin manufacturers such as The Dow Chemical Company and the Exxon Chemical Company. An exemplary ethylene/alpha-olefin copolymer is ENGAGE™ EG 8150, an ethylene/octene copolymer commercially available from Dow. This material has a density of 0.868 g/cc (ASTM D-792), a melt index of 0.5 dg/min. (ASTM D-1238), and 25% octene (ASTM D-2238, Method B). Other suitable ethylene/alpha-olefin copolymers from Dow include ENGAGE™ EG 8100, an ethylene/octene copolymer having a density of 0.87 g/cc (ASTM D-792), a melt index of 1 dg/min. (ASTM D-1238), and 24% octene (ASTM D-2238, Method B); and ENGAGE™ EG 8200, an ethylene/octene copolymer having a density of 0.87 g/cc (ASTM D-792), a melt index of 5 dg/min. (ASTM D-1238), and 24% octene (ASTM D-2238, Method B).

Third, core layer 16 preferably imparts flexibility to multilayer film 10, as well as strength and gas impermeability. Any material which provides a desired level of flexibility, strength, and gas impermeability to film 10 and which adheres well to adhesive layer 14 may be used to form layer 16. In this regard, layer 16 preferably comprises a material selected from the group consisting of very low density polyethylene, linear low density polyethylene, ethylene/vinyl acetate copolymer, ethylene/methyl acrylate copolymer, high density polyethylene, a homogeneous ethylene/alpha-olefin copolymer, and blends of the foregoing materials. Each of the foregoing materials are widely available. For example, very low density polyethylene (VLDPE) may be obtained commercially from companies such as Dow and Union Carbide. Preferred VLDPEs have a density ranging from 0.900 to 0.912 g/cc and a melt index ranging from 0 to 6. Exemplary VLDPEs are DFDA 1137 and DEFD 1362 from Union Carbide, both having a density of about 0.906 g/cc and a melt index which can range from 0.8 to 1. Another suitable VLDPE is ATTANE from The Dow Chemical Company.

Preferably, third, core layer 16 comprises a homogeneous ethylene/alpha-olefin copolymer or a blend of homogeneous ethylene/alpha-olefin copolymers. Such copolymers have been found to result in a medical solution pouch with improved optical properties after the pouch has been heat-sterilized. The homogeneous ethylene/alpha-olefin copolymer or blend of copolymers preferably has a density ranging from about 0.89 to about 0.92 grams per cubic centimeter and, more preferably, from about 0.90 to about 0.91 g/cc. Preferably, the melt-flow index (ASTM D-1238) of the homogeneous ethylene/alpha-olefin copolymer or blend of copolymers is less than 20, more preferably less than 10, even more preferably less than 2.2, and, most preferably, between 0.1 and 1.5. Exemplary homogeneous ethylene/alpha-olefin copolymers include the following from the Exxon Chemical Company: Exact™ 3029 with a melt index of approximately 1.2 dg/min (ASTM D-1238(E)), a density of approximately 0.91 g/cc (ASTM D-792), and a DSC peak melting point of approximately 107° C. (Exxon Method); Exact™ 3025 with a melt index of approximately 1.2 dg/min (ASTM D-1238(E)), a density of approximately 0.91 g/cc (ASTM D-792), and a DSC peak melting point of approximately 103° C. (Exxon Method); Exact™ 3028 with a melt index of approximately 1.2 dg/min (ASTM D-1238(E)), a density of approximately 0.90 g/cc (ASTM D-792), and a DSC peak melting point of approximately 92° C.(Exxon Method); and Exact™ 4011 with a melt index of approximately 2.2 dg/min (ASTM D-1238(E)), a density of approximately 0.89 g/cc (ASTM D-1505), and a DSC peak melting point of approximately 70° C. (Exxon Method). Other suitable homogeneous ethylene/alpha-olefin copolymers include AFFINITY™ resins from the Dow Chemical Co., such as PL 1880 with a density of approximately 0.90 g/cc and melt index of approximately 1.0; PL 1840 with a density of approximately 0.91 g/cc and melt index of approximately 1.0; PL 1845 with a density of approximately 0.91 g/cc and melt index of approximately 3.5; and FM 1570 with a density of approximately 0.915 g/cc and melt index of approximately 1.0.

Fourth, adhesive layer 18 may comprise a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, and anhydride-modified very low density polyethylene. The particular choice of material for layer 18 will depend upon the materials selected for layers 16 and 20. Suitable anhydride-modified ethylene/ methyl acrylate copolymers are commercially available from DuPont under the tradenames BYNEL™ CXA E369 and BYNEL™ CXA E374, and from Quantum Chemicals under the tradename PLEXAR™ 3382. Anhydride-modified linear low density polyethylene is commercially available from Mitsui under the tradenames ADMER™ NF 500 and NF 550, and from DuPont under the tradename BYNEL™ 4134.

When multilayer film 10 is formed into medical solution pouch, fifth, heat/abuse-resistant layer 20 forms the outside surface of the pouch. The primary functions of layer 20 are to provide heat-resistance to the pouch during heat-sealing and heat-sterilization, and to provide abuse-resistance from external handling and abrasion. Layer 20 preferably comprises a material selected from the group consisting of polyamide, copolyamide, and copolyester. Suitable polyamides and copolyamides include nylon 66, nylon 610, nylon 12 and copolymers thereof, nylon 11 and copolymers thereof, amorphous nylon, and blends of the foregoing polyamides and copolyamides. A preferred copolyamide is nylon 66/610. Such a material is commercially available from EMS-American Gricon, Inc. under the designation XE 3303. Suitable copolyesters are commercially available from Eastman Chemical Products, Inc. under the tradenames ECDEL™ 9965, 9966, and 9967.

Multilayer film 10 preferably has a total thickness ranging from about 3 to 14 mils (1 mil=0.001 inch=0.0254 mm), preferably 5 to 10 mils, and most preferably 6.5 to 9.5 mils. Layers 12 and 20 may range in thickness from about 0.5 to about 8 mils, but preferably are about 0.75 mil in thickness. Layers 14 and 18 may range in thickness from about 0.1 to about 0.75 mil, but preferably are about 0.4 mil in thickness. Layer 16 may range in thickness from about 1 to about 9 mils, but preferably is about 5.2 mils in thickness.

As can be appreciated by those having ordinary skill in this art, the multilayer films of the present invention are not limited to the five-layer structure described above. Films having a fewer number of layers or a greater number of layers than that shown are included within the scope of the present invention. For example, additional layers, such as high density polyethylene, may be included in the film in order to increase the moisture barrier capabilities of the film if desired. Additional oxygen barrier layers may also be included if desired.

The multilayer film of the present invention has been described in connection with a pouch for the packaging of medical solutions. However, it is to be understood that other embodiments of the invention are also envisioned. That is, first, heat-seal layer 12 and second, adhesive layer 14 may be joined to different layers with different functional properties than those described in order to form films having other uses. For example, overwrap films for I.V. bags (to protect the bags from dust and to provide an additional moisture barrier barrier) can be made by joining a layer of high density polyethylene (HDPE) to adhesive layer 14 to form a three-layer structure with layer 14 at the center. Additional layers, such as oriented polyethylene terephthalate (PET) or nylon, could be joined to the HDPE layer via a second adhesive layer. The resultant film could be used as an overwrap film or as lidstock for, e.g., polypropylene trays. Film for lidstock could also be formed by replacing the oriented PET or nylon with polycarbonate or ethylene/vinyl alcohol. As can be appreciated, other films and/or other applications are also possible.

Various additives may used in any or all of the layers of the multilayer film of the present invention. Such additives include, without limitation, antiblocking agents, antioxidants, processing aids such as calcium stearate, pigments, antistatic agents, etc. Where the multilayer film is to be used for making medical solution pouches, the amount of additive included in the film is preferably kept to a minimum in order to minimize the liklihood that such additives will be extracted into the medical solution during heat-sterilization.

The multilayer films of the present invention are preferably formed by cast coextrusion as a tubular film. Containers for medical applications or other end uses can be made directly from the coextruded, tubular film, or alternatively from rollstock material obtained from the tube after it has been slit and ply-separated. A hot blown process can also be used to make the film, although the optical properties of the resulting pouch would likely be inferior to those from a cast coextrusion process. Other processes, such as extrusion coating, conventional lamination, slot die extrusion, etc., can also be used to make the multilayer film of the present invention, although these alternative processes can be more difficult or less efficient than the preferred method.

Multilayer films in accordance with the present invention are preferably cross-linked. Cross-linking increases the structural strength of the film at elevated temperatures and/or increases the force at which the material can be stretched before tearing apart, and may also improve the optical properties of the film. Cross-linking is preferably done by irradiation, i.e., bombarding the film with particulate or non-particulate radiation such as high-energy electrons from an accelerator or cobalt-60 gamma rays, to cross-link the materials of the film. A preferred irradiation dosage level is in the range of from about 2 megarads (M.R.) to about 8 M.R. Any conventional cross-linking technique may be used. For example, electronic cross-linking may be carried out by curtain-beam irradiation. Chemical cross-linking techniques may also be employed, e.g., by the use of peroxides.

Pouches made by the multilayer films of the present invention may be sealed by various means well known in the art, including impulse and hot-bar sealing. An example of a commercially available impulse-type sealing device is a Vertrod™ heat sealer. The heat-seals which form the top and bottom of the pouch (generally shorter in length than the sides of the pouch) are preferably formed in the machine direction of the multilayer film (i.e., the direction in which the film moved through the production equipment), verses the transverse direction (which is perpendicular to the machine direction).

The invention may be further understood by reference to the following examples, which are provided for the purpose of representation, and are not to be construed as limiting the scope of the invention.

EXAMPLES

All of the films used in the examples were cast coextruded and cross-linked by high-energy electron radiation. Each of the films had the five-layer structure shown in FIG. 1 and had a total thickness of approximately 7.5 mils. The first and fifth layers had a thickness of about 0.75 mil, the second and fourth layers had a thickness of about 0.4 mil, and the third layer had a thickness of approximately 5.6 mils. All percentages are weight percents unless indicated otherwise.

The materials used in the examples are identified below:

"PEC-1": Z9450 (™); a propylene/ethylene copolymer having an ethylene content of about 6 weight percent and a density of about 0.89 g/cc (ASTM D-1505); obtained from the Fina Oil & Chemical Company of Dallas, Tex.

"PEC-2": PLTD 665 (™); a propylene/ethylene copolymer having an ethylene content of about 6 weight percent and a density of about 0.89 g/cc (ASTM D-1505); obtained from the Exxon Chemical Company of Baytown, Tex.

"SEBS": Kraton G-1652 (™); a styrene-ethylene-butylene-styrene block copolymer having a tensile strength of about 4500 psi (ASTM D412), a 300% modulus of about 700 psi (ASTM D412), an elongation of about 500% (ASTM D412), a Shore A hardness of about 75, and a specific gravity of about 0.91; obtained from the Shell Chemical Co. of Houston, Tex.

"EAO": ENGAGE EG 8150 (™); an ethylene/octene copolymer having a density of 0.868 g/cc (ASTM D-792), a melt index of 0.5 dg/min. (ASTM D-1238), and 25% octene (ASTM D-2238, Method B); obtained from The Dow Chemical Company, Midland, Mich.

"VLDPE": DEFD 1362 (™); a very low density polyethylene having a density of about 0.906 g/cc and a melt index of about 0.9; obtained from Union Carbide Chemicals and Plastics Company, Inc., Fort Lavaga, Tex.

"EMA": BYNEL CXA E374 (™); an anhydride-modified ethylene/methyl acrylae copolymer having a melt index of about 2.8 dg/min (ASTM D1238, 190/2.16) and a density of 0.931 g/cc (ASTM 1505); obtained from E. I. DuPont de Nemours of Wilmington, Del.

"CPE": ECDEL 9965 (™); a copolyester ether having a flow rate of about 15 grams/10 minutes (ASTM D1238, 230/2.16) and a specific gravity of about 1.13 (ASTM D 792); obtained from Eastman Chemical Products, Inc., Kingsport, Tenn.

"AO": Irganox 1010 (™); an antioxidant and thermal stabilizer obtained from the Ciba-Geigy Corporation.

Example 1

A multilayer film in accordance with the present invention had the following five-layer structure:

First, heat-seal layer: 80% EPC-1+20% SEBS
Second, adhesive layer: EAO
Third, core layer: VLDPE
Fourth, adhesive layer: EMA
Fifth, heat/abuse-resistant layer: 99.5% CPE+0.5% AO

Example 2

A multilayer film in accordance with the present invention had the same structure as in Example 1 except the second, adhesive layer comprised 50% EAO+50% heat-seal material (i.e., 80% EPC-1+20% SSBS).

Example 3 (Comparative)

A multilayer film had the same structure as in Example 1 except the second, adhesive layer comprised 50% core layer material (VLDPE)+50% heat-seal material (80% EPC-1+20% SEBS).

Example 4 (Comparative)

A multilayer film had the same structure as in Example 1 except the second, adhesive layer comprised 75% core layer material (VLDPE)+heat-seal material (80% EPC-1+20% SEBS).

Example 5

Films from Examples 1–4 were formed into 1-liter-capacity medical solution pouches and tested for their ability to resist leakage under the application of a pressure-cuff thereto. Ten (10) such pouches were made from each of the four films. A Vertrod™ impulse heat-sealer was used to form fin-type heat-seals at the periphery of each pouch. The pouches were then filled with 1 liter of water through an opening at the top of the pouch. The opening was then heat-sealed with the Vertrod™ impulse heat-sealer so that 1 liter of water was completely enclosed within each pouch.

Each water-containing pouch was then heat-sterilized in an autoclave at 250° F. for 30 minutes. The pouches were allowed to cool to room temperature and then a 0.5 liter pressure-cuff was placed around each pouch. The pressure-cuff was pressurized to 350 mm of Hg and a timer was started. The pouches were checked at regular intervals so that that the approximate elapsed time when each pouch failed (i.e., began to leak) could be determined. This determination was made by averaging two time measurements: 1) the last measured time when the pouch was checked and found not to be leaking, and 2) the elapsed time when the pouch was found to be leaking. Table 1 summarizes the results of the pressure-cuff tests, and reports the average time-to-failure for each of the ten pouches made from each of the films of Examples 1–4.

The highest and lowest time-to-failure measurements for pouches made from the film of Example 1 were 602 hours and 227.75 hours, respectively. For the film of Example 2, the highest and lowest time-to-failure measurements were 115.75 hours and 44.75 hours, respectively. The highest and lowest time-to-failure measurements for pouches made from the film of Example 3 were 122.2 hours and 33.15 hours, respectively. For the film of Example 4, the highest and lowest time-to-failure measurements were 4.17 hours and 1.18 hours, respectively.

TABLE 1

| FILM | SECOND, ADHESIVE LAYER | AVG. TIME-TO-FAILURE OF 10 POUCHES |
| --- | --- | --- |
| Example 1 | EAO | 433.6 Hours |
| Example 2 | 50% EAO/50% VLDPE | 68.6 Hours |
| Example 3 (Comparative) | 50% heat-seal mat'l/ 50% VLDPE | 56.6 Hours |
| Example 4 (Comparative) | 25% heat-seal mat'l/ 75% VLDPE | 2.8 Hours |

As shown in Table 1, the films of the present invention (i.e., wherein the second, adhesive layer comprises an ethylene/alpha-olefin copolymer having a density of 0.89 g/cc or less) result in medical solution pouches having superior pressure-cuff resistance. Although the ethylene/alpha-olefin copolymer may be blended with another material (e.g., core layer material), the best results occur when the second, adhesive layer comprises primarily ethylene/alpha-olefin copolymer, as shown by the excellent pressure-cuff test-results of the film of Example 1.

Example 6

Medical solution pouches made from the films of Example 1 and (comparative) Example 3 were pressure-cuff tested under even more severe conditions than in Example 5. All conditions were the same as in Example 5 except that the 1 liter pouches were made shorter and 0.25 inches wider so that a greater portion of the pouch remained within the pressure-cuff throughout the duration of the test. With the thinner, taller pouches of Example 5, top and bottom portions of those pouches tended to be squeezed out of the open upper and lower ends of the pressure-cuff. With the shorter, wider pouches of this Example, less of the pouch was squeezed out of the pressure-cuff and, as a result, the stress placed on the top and bottom portions of the pouches was greater than in Example 5.

When tested in this manner, the average time-to-failure of 10 pouches made from the comparative film of Example 3 was 27.6 hours. The highest and lowest time-to-failure measurements for pouches made from the film of Example 3 were 38.75 hours and 6.67 hours, respectively. The average time-to-failure of 5 pouches made from the film of Example 1 (in accordance with the present invention) was 214.4 hours, much longer than the film of Example 3. The highest and lowest time-to-failure measurements for these pouches were 303.5 hours and 122.17 hours, respectively.

To further increase the severity of the test, the pressure in the cuffs around the other 5 (of 10 total) pouches of the film of Example 1 was increased to 400 mm Hg after 72 hours at 350 mm Hg (at which pressure all of the other pouches had been tested). The average time-to-failure of these pouches was 231.8 hours. The highest and lowest time-to-failure measurements for these pouches were 317.5 hours and 181.75 hours, respectively. (Note: One of these pouches herniated when the pressure in one of the cuffs accidentally reached 550 mm Hg and is not factored in to the foregoing time-to-failure figure).

Example 7

Ten 2-liter pouches were made from each of the films of Examples 1–4, filled with 2 liters of water and heat-sealed to completely enclose the water, heat-sterilized in an autoclave at 250° F. for 30 minutes, allowed to cool to room temperature, and then tested for durability by dropping them from various heights onto a concrete floor. The heights from which the pouches were dropped stated at 6 feet and increased by 2-foot increments up to 12 feet for surviving pouches. The results of such testing is summarized in Table 2 below.

TABLE 2

| FILM | POUCH FAILURES | | | | |
| --- | --- | --- | --- | --- | --- |
| | 6 FT. | 8 FT. | 10 FT. | 12 FT. | TOTAL |
| EX. 1 | 0 | 0 | 3 | 1 | 4 |
| EX. 2 | 0 | 3 | 0 | 1 | 4 |
| EX. 3 (Comp.) | 0 | 0 | 1 | 2 | 3 |
| EX. 4 (Comp.) | 0 | 1 | 1 | 0 | 2 |

As illustrated, the films of the present invention exhibited "drop-test" results which were on par with those of the comparative films. It should be noted that only 9 pouches were tested for the film of Example 4.

Example 8

In order to determine the effect of elastomer in the first, heat-seal layer on pressure-cuff resistance and drop-test performance, a film was prepared which was similar in composition to the film of Example 3, except that no elastomer was included in the first, heat-seal layer. Ten, 1-liter pouches were made from this film and pressure-cuff tested as described in Example 5. All 10 pouches failed immediately upon the application of pressure to the pressure-cuff.

In the drop-test, ten 2-liter pouches made from the film without elastomer in the heat-seal layer exhibited 7 total failures. Thus, it is important to include elastomer in the first, heat-seal layer of a multilayer film which is to be used to make medical solution pouches.

While the invention has been described with reference to illustrative examples, those skilled in the art will understand that various modifications may be made to the invention as described without departing from the scope of the claims which follow.

What is claimed is:

1. A multilayer film, comprising:
   a) a first layer comprising a blend of homopolymer or copolymer of polypropylene and elastomer;
   b) a second layer in adherence with said first layer, said second layer comprising a homogeneous ethylene/alpha-olefin copolymer having a density of less than or equal to 0.89 grams per cubic centimeter; and
   c) a third, core layer in adherence with said second layer such that said second layer is positioned between said first and third layers.

2. The multilayer film of claim 1, wherein said homopolymer or copolymer of polypropylene comprises propylene/ethylene copolymer.

3. The multilayer film of claim 1, wherein said elastomer is selected from the group consisting of styrene-ethylene-butylene-styrene block copolymer, styrene-butadiene-styrene block copolymer, styrene-isoprene-styrene block copolymer, ethylene-propylene rubber, and ethylene-propylene-diene terpolymer.

4. The multilayer film of claim 1, wherein said elastomer is present in said first layer at a weight percentage ranging from about 5 to about 50, based on the weight of said first layer.

5. The multilayer film of claim 4, wherein said elastomer is present in said first layer at a weight percentage ranging from about 10 to about 40, based on the weight of said first layer.

6. The multilayer film of claim 1, wherein said ethylene/alpha-olefin copolymer has a density of less than or equal to 0.88 grams per cubic centimeter.

7. The multilayer film of claim 1 wherein said second layer consists essentially of homogeneous ethylene/alpha-olefin copolymer having a density of less than or equal to 0.89 grams per cubic centimeter.

8. The multilayer film of claim 1, wherein said third layer comprises a material selected from the group consisting of very low density polyethylene, linear low density polyethylene, ethylene/vinyl acetate copolymer, ethylene/methyl acrylate copolymer, high density polyethylene, homogeneous ethylene/alpha-olefin copolymer, and blends of the foregoing materials.

9. The multilayer film of claim 1, further including a fourth layer in adherence with said third layer.

10. The multilayer film of claim 9, wherein said fourth layer comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, and anhydride-modified very low density polyethylene.

11. The multilayer film of claim 9, further including a fifth layer in adherence with said fourth layer.

12. The multilayer film of claim 11, wherein said fifth layer comprises a material selected from the group consisting of polyamide, copolyamide, and copolyester.

13. The multilayer film of claim 11, wherein said first layer comprises a blend of propylene/ethylene copolymer and styrene-ethylene-butylene-styrene block copolymer;

said third layer comprises homogeneous ethylene/alpha-olefin copolymer; and said fifth layer comprises copolyester or polyamide.

14. The multilayer film of claim 11, wherein said multilayer film has a thickness ranging from about 3 to about 14 mils.

15. The multilayer film of claim 1, wherein said ethylene/alpha-olefin copolymer has an alpha-olefin content of greater than about 20 percent by weight of the copolymer.

16. A pouch for the packaging and administration of medical solutions, said pouch comprising a multilayer film which comprises:

a) a first layer comprising a blend of homopolymer or copolymer of polypropylene and elastomer;

b) a second layer in adherence with said first layer, said second layer comprising a homogeneous ethylene/alpha-olefin copolymer having a density of less than or equal to 0.89 grams per cubic centimeter; and c) a third, core layer in adherence with said second layer such that said second layer is positioned between said first and third layers.

17. The pouch of claim 16, wherein said homopolymer or copolymer of polypropylene comprises propylene/ethylene copolymer.

18. The pouch of claim 16, wherein said elastomer is selected from the group consisting of styrene-ethylene-butylene-styrene block copolymer, styrene-butadiene-styrene block copolymer, styrene-isoprene-styrene block copolymer, ethylene-propylene rubber, and ethylene-propylene-diene terpolymer.

19. The pouch of claim 16, wherein said elastomer is present in said first layer at a weight percentage ranging from about 5 to about 50, based on the weight of said first layer.

20. The pouch of claim 19, wherein said elastomer is present in said first layer at a weight percentage ranging from about 10 to about 40, based on the weight of said first layer.

21. The pouch of claim 16, wherein said ethylene/alpha-olefin copolymer has a density of less than or equal to 0.88 grams per cubic centimeter.

22. The pouch of claim 16, wherein said second layer consists essentially of homogeneous ethylene/alpha-olefin copolymer having a density of less than or equal to 0.89 grams per cubic centimeter.

23. The pouch of claim 16, wherein said third layer comprises a material selected from the group consisting of very low density polyethylene, linear low density polyethylene, ethylene/vinyl acetate copolymer, ethylene/methyl acrylate copolymer, high density polyethylene, homogeneous ethylene/alpha-olefin copolymer, and blends of the foregoing materials.

24. The pouch of claim 16, further including a fourth layer in adherence with said third layer.

25. The pouch of claim 24, wherein said fourth layer comprises a material selected from the group consisting of anhydride-modified ethylene/vinyl acetate copolymer, anhydride-modified ethylene/methyl acrylate copolymer, anhydride-modified ethylene/ethyl acrylate copolymer, anhydride-modified linear low density polyethylene, and anhydride-modified very low density polyethylene.

26. The pouch of claim 24, further including a fifth layer in adherence with said fourth layer.

27. The pouch of claim 26, wherein said fifth layer comprises a material selected from the group consisting of polyamide, copolyamide, and copolyester.

28. The pouch of claim 26, wherein said first layer comprises a blend of propylene/ethylene copolymer and styrene-ethylene-butylene-styrene block copolymer;

said third layer comprises homogeneous ethylene/alpha-olefin copolymer; and said fifth layer comprises a copolyester or polyamide.

29. The pouch of claim 26, wherein said multilayer film has a thickness ranging from about 3 to about 14 mils.

30. The pouch of claim 16, wherein said ethylene/alpha-olefin copolymer has an alpha-olefin content of greater than about 20 percent by weight of the copolymer.

31. A multilayer film, comprising:

a) a first layer comprising a blend of homopolymer or copolymer of polypropylene and elastomer; and b) a second layer in adherence with said first layer, said second layer comprising a homogeneous ethylene/alpha-olefin copolymer having a density of less than or equal to 0.89 grams per cubic centimeter and an alpha-olefin content of greater than 20 percent by weight of the copolymer.

32. The multilayer film of claim 31, further including a third layer in adherence with said second layer.

33. A pouch for the packaging and administration of medical solutions, said pouch comprising a multilayer film which comprises:

a) a first layer comprising a blend of homopolymer or copolymer of polypropylene and elastomer; and b) a second layer in adherence with said first layer, said second layer comprising a homogeneous ethylene/alpha-olefin copolymer having a density of less than or equal to 0.89 grams per cubic centimeter and an alpha-olefin content of greater than 20 percent by weight of the copolymer.

34. The pouch of claim 33, further including a third layer in adherence with said second layer.

* * * * *